US012255416B2

(12) United States Patent
Wen

(10) Patent No.: US 12,255,416 B2
(45) Date of Patent: Mar. 18, 2025

(54) PROTECTIVE CAP FOR HIGH-CURRENT PLUG CONNECTOR

(71) Applicant: HARTING Electric Stiftung & Co. KG, Espelkamp (DE)

(72) Inventor: Ensign Wen, Zhuhai (CN)

(73) Assignee: HARTING Electric Stiftung & Co. KG, Espelkamp (DE)

(*) Notice: Subject to any disclaimer, the term of this patent is extended or adjusted under 35 U.S.C. 154(b) by 278 days.

(21) Appl. No.: 18/017,112

(22) PCT Filed: Jul. 5, 2021

(86) PCT No.: PCT/DE2021/100578
§ 371 (c)(1),
(2) Date: Jan. 20, 2023

(87) PCT Pub. No.: WO2022/017558
PCT Pub. Date: Jan. 27, 2022

(65) Prior Publication Data

US 2023/0307863 A1 Sep. 28, 2023

(30) Foreign Application Priority Data

Jul. 23, 2020 (CN) ........................ 202010716621.5

(51) Int. Cl.
*H01R 13/44* (2006.01)
*H01R 4/22* (2006.01)
*H01R 9/22* (2006.01)

(52) U.S. Cl.
CPC ............... *H01R 13/44* (2013.01); *H01R 4/22* (2013.01); *H01R 9/223* (2013.01)

(58) Field of Classification Search
CPC .......... H01R 13/44; H01R 4/22; H01R 9/223; H01R 11/284; H01R 13/5804; H01R 4/70
See application file for complete search history.

(56) References Cited

U.S. PATENT DOCUMENTS 3,544,953 A * 12/1970 Shannon ............ H01M 50/571 439/522
5,439,759 A * 8/1995 Lippert ............... H01M 50/571 174/138 F (Continued)

FOREIGN PATENT DOCUMENTS

| | | | |
|---|---|---|---|
| CN | 107176120 | A | 9/2017 |
| DE | 102016201328 | A1 | 8/2017 |
| JP | 2016004660 | A | 1/2016 |

*Primary Examiner* — Travis S Chambers
(74) *Attorney, Agent, or Firm* — Smartpat PLC

(57) ABSTRACT

A protective cap (4, 4') for an electrical high-current plug connector (1) is substantially box-shaped and has at least one open side (5). The protective cap (4) has a gripping element (8) for fixing the protective cap (4, 4') to a connection region (3, 3', 3'') of the high-current plug connector (1), which is provided for connecting an electrical conductor. The gripping element (8) extends into the open side (5). The gripping element (8) has a pincer-like design with two arms (8*a*, 8*b*) which cross over each other or two arms (8*a*, 8*b*) oriented relative to each other in an S-shape. Each of the two arms (8*a*, 8*b*) is integrally formed on the protective cap (4, 4') in a lower region and grips around the connection region (3, 3', 3'') for a conductor to be connected in an upper region.

8 Claims, 2 Drawing Sheets

(56) References Cited

U.S. PATENT DOCUMENTS

| | | | |
|---|---|---|---|
| 5,916,002 A | 6/1999 | Gottschalk et al. | |
| 10,957,995 B1 * | 3/2021 | Belisle | H01R 9/223 |
| 2017/0093084 A1 | 3/2017 | Rottman et al. | |
| 2018/0337466 A1 | 11/2018 | Salkovic et al. | |
| 2020/0220299 A1 | 7/2020 | Brescianini | |

* cited by examiner

PROTECTIVE CAP FOR HIGH-CURRENT PLUG CONNECTOR

TECHNICAL FIELD

The disclosure relates to a protective cap for an electrical high-current plug connector. The disclosure also relates to at least two adjacent high-current plug connectors which are each equipped with a protective cap. Such protective caps are used in particular for touch protection in high-current applications, for example in the railway sector. Such protective caps also serve in particular to enlarge the air gaps and creepage distances when high-current plug connectors are arranged next to one another or in the relative vicinity of one another.

BACKGROUND

A touch-protection cap for contact elements in high-current applications is disclosed in DE 10 2016 201 328 A1. When a contact element or a plug connector is touched, such caps often fall off and are lost such that there is a potential hazard.

SUMMARY

The disclosure provides a reliable and secure protective cap for a high-current plug connector.

The protective cap is provided for an electrical high-current plug connector. High-current plug connectors contain high-current contact elements which are designed to transmit high currents and have a correspondingly bulky form. In such applications, electrical currents within a range from 80 A to over 1000 A can flow. Particularly when used for rail transport, currents of 600 A to 800 A can usually be expected. The protective caps therefore serve not only as touch protection but at the same time also increase the air gaps and creepage distances between adjacent high-current contacts such that so-called voltage or electric arcs and/or flashovers cannot occur.

The protective cap has an essentially box-shaped form. The protective cap has a cover from which three closed side faces protrude approximately at right angles. One side face has an open form. This open side face offers in particular space for the connection region of an electrical conductor to be connected. The cover of the protective cap preferably has a cylindrical protrusion which is provided to receive part of the essentially cylindrical high-current contact element with a precise fit.

Conductors with correspondingly large cross-sections and current-carrying capacities are connected to the high-current plug connector or to the high-current contact element. The protective cap has a gripping element for fixing the protective cap to the connection region for a connected conductor. The gripping element preferably projects into the open side face and is advantageously oriented parallel to the opposing side faces of the protective cap.

The gripping element advantageously has a pincer-like form. The gripping element has either two arms which cross over each other or two arms oriented relative to each other in an S-shape. The arms are each integrally formed on the protective cap in the lower region and each grip around the connection region for the connected conductor in the upper region.

In an advantageous variant, the protective cap has a T-shaped structure integrally formed on the cover. The protective cap can thus be fixed captively and reversibly, for example on the conductor, with the aid of a cable tie. As a result, the retaining forces of the gripping element ensure that the protective cap cannot inadvertently fall off and at all times sits reliably in the correct position on the connection region of the high-current plug connector.

The T-shaped structure is preferably oriented parallel to the open side face of the protective cap. However, it does not project into the side face and instead protrudes from the protective cap in the connecting direction. The abovementioned gripping element and the T-shaped structure thus extend within the same plane.

The protective cap advantageously has a cutout in each of two opposing side faces. These cutouts are matched to the outer contour of the insulating body of the high-current plug connector so that they fit precisely and ensure that the protective cap is retained particularly well.

It is advantageous if the protective cap is made or produced from plastic. Plastics with suitable dielectric properties can be selected here which at the same time are easy to process and cost-effective.

In use, a first high-current plug connector is generally arranged next to at least one second high-current plug connector. The high-current plug connectors are each equipped with a protective cap. By virtue of the protective cap, the so-called air gaps and creepage distances between the adjacent high-current plug connectors are increased such that, even in the case of high current strengths, no flashovers occur between the high-current plug connectors.

BRIEF DESCRIPTION OF THE DRAWINGS

An exemplary embodiment of the invention is illustrated in the drawings and is explained in detail below.

DETAILED DESCRIPTION

The drawings contain partly simplified schematic illustrations. Identical reference symbols are partly used for the same but possibly not identical elements. Different views of the same elements can be at different scales. Specifications of directions such as “upper”, “lower”, “left”, “right”, “front”, and “back” relate to the respective illustrations and can vary with reference to the elements illustrated.

Figure 1:
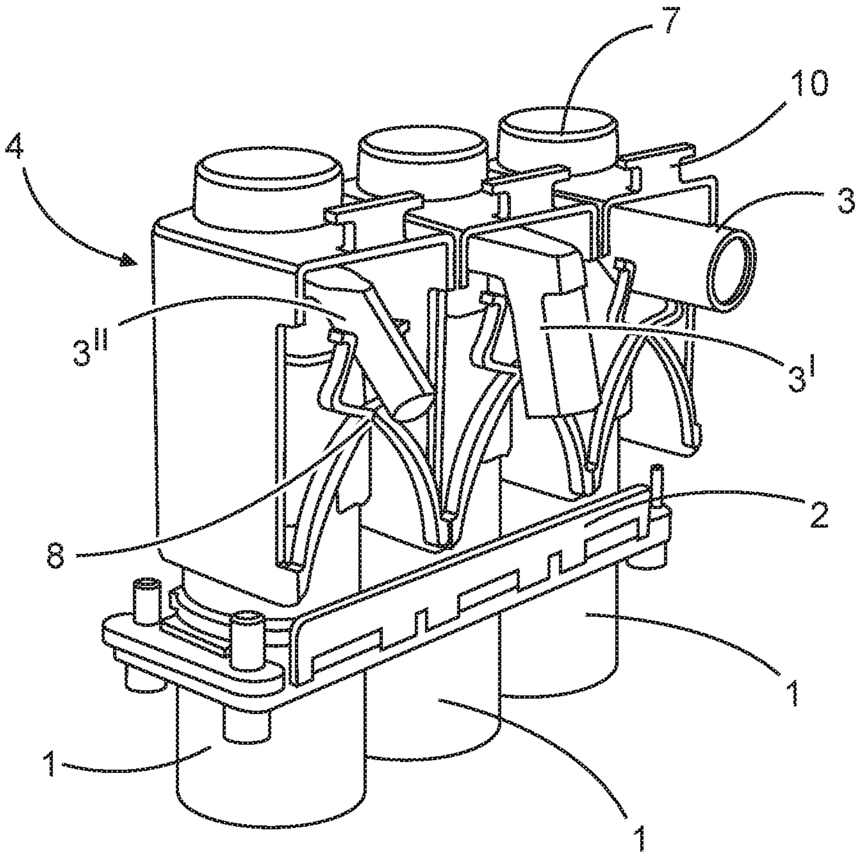
FIG. 1 shows a perspective illustration of a plurality of high-current plug connectors arranged next to one another with a protective cap.

FIG. 1 shows three high-current plug connectors 1 arranged (in a row) next to one another. The high-current plug connectors 1 are fixed in a retaining frame 2. The retaining frame 2 can be installed, for example, in a mounting housing (not shown) and the latter is in turn mounted on a housing wall (not shown). Each high-current plug connector 1 has a connection region 3 for an electrical conductor (not shown) which here takes the form of a crimped connection (crimp sleeve). Alternatively, other types of connection for the conductors, for example a screwed connection, can also be provided.

The high-current plug connectors 1 are each provided with a protective cap 4, 4'. The protective cap 4, 4' has an essentially box-shaped form and is pushed onto the respective high-current plug connector 1. The protective cap 4, 4' has three closed side faces and one open side face 5. The protective cap 4, 4' has a cover 6 with a cylindrical protrusion 7. The cylindrical protrusion 7 is configured to receive the high-current contact element with a precise fit.

Figure 2:
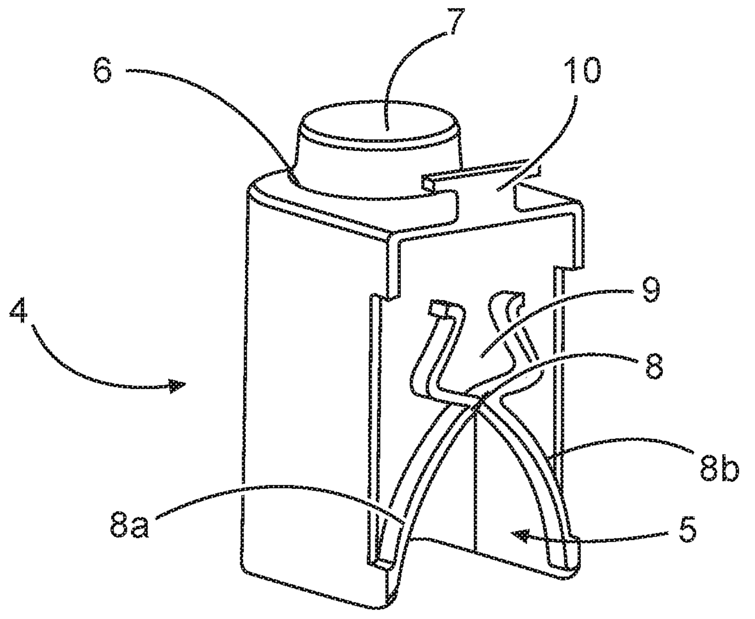
FIG. 2 shows a perspective illustration of a first embodiment of a protective cap.
Figure 3:
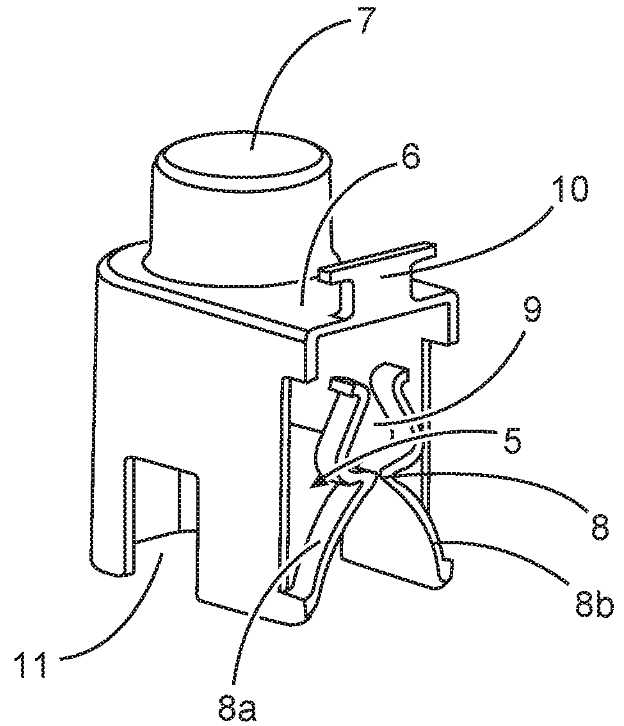
FIG. 3 shows a perspective illustration of a second embodiment of a protective cap.

FIGS. 2 and 3 each show different embodiments of a protective cap 4, 4'. The protective cap 4, 4' has a gripping element 8 for fixing the protective cap 4, 4' on a connection region 3, 3', 3" for a connected conductor, wherein the gripping element 8 projects into the open side face. The gripping element 8 has two arms 8*a*, 8*b* oriented relative to each other in an S-shape. The arms 8*a*, 8*b* are facing each other. In the region of the bulge of the S, the arms 8*a*, 8*b* have the shortest distance from each other and can even possibly touch each other here.

When the protective cap 4, 4' is put on, the resilient arms 8*a*, 8*b* first move apart and away from each other until they finally engage over the connection region 3, 3', 3" of the high-current plug connector 1 and hence fix the protective cap 4, 4' such that it cannot tilt.

In the lower region, the arms 8*a*, 8*b* are each integrally formed on the protective cap 4. In their extended regions, the arms 8*a*, 8*b* are configured so that they can move and are resilient. In the upper region, the arms 8*a*, 8*b* form, or the gripping element 8 forms, a pincer-like receiving region 9. This receiving region 9 engages over the connection region 3, 3', 3" of the high-current plug connector 1 such that the protective cap 4, 4' is retained on the high-current plug connector 1 captively and so that it cannot be displaced. The protective cap 4, 4' can be pulled off from the high-current plug connector 1 again. All that is required here is to overcome the spring force of the arms 8*a*, 8*b* of the gripping element 8.

The protective cap 4, 4' has a T-shaped structure 10. The T-shaped structure 10 is integrally formed on the cover 6 of the protective cap 4. 4' in the region of the open side face 5, facing the cylindrical protrusion 7. The protective cap 4 can consequently additionally be fixed captively, for example, on the connected conductor or on the mounting housing with the aid of a cable tie (not shown).

In a further embodiment (FIG. 3), two opposing side faces of the protective cap 4' have a recess 11. This recess 11 corresponds to an integrally formed or molded part of an insulating body (not shown) of an alternative high-current plug connector.

Even though different aspects or features of the invention are shown in the drawings in each case in combination, unless otherwise stated, it is clear to a person skilled in the art that the combinations illustrated and discussed are not the only ones possible. In particular, corresponding units or groups of features from different exemplary embodiments can be interchanged.

LIST OF REFERENCE NUMERALS

1 high-current plug connector
2 retaining frame
3 connection region for an electrical conductor
4 protective cap
5 open side face
6 cover
7 cylindrical protrusion
8 gripping element
8*a*, 8*b* arm of the gripping element
9 pincer-like receiving region
10 T-shaped structure
11 recess

The invention claimed is:

1. A protective cap (4, 4') for an electrical high-current plug connector (1),
wherein the protective cap (4, 4') has an essentially box-shaped form and has at least one open side face (5),
wherein the protective cap (4) has a gripping element (8) for fixing the protective cap (4, 4') on a connection region (3, 3', 3") of the high-current plug connector (1) which is provided for connecting an electrical conductor,
wherein the gripping element (8) projects into the open side face (5),
wherein the gripping element (8) has a pincer-like design,
wherein the gripping element (8) has two arms (8*a*, 8*b*) which cross over each other or two arms (8*a*, 8*b*) oriented relative to each other in an S-shape, and
wherein each of the two arms (8*a*, 8*b*) is integrally formed on the protective cap (4, 4') in a lower region and grips around the connection region (3, 3', 3") for a conductor to be connected in an upper region.

2. The protective cap (4, 4') as claimed in claim 1,
wherein the protective cap (4, 4') has a recess (11) in each of two opposing side faces.

3. The protective cap (4, 4') as claimed in claim 1,
wherein the protective cap (4, 4') is made of plastic.

4. A system, comprising:
a first high-current plug connector (1) and
a second adjacent high-current plug connector (1),
wherein the high-current plug connectors (1) are each equipped with the protective cap (4, 4') as claimed in claim 1.

5. The protective cap (4, 4') as claimed in claim 1,
wherein the protective cap (4, 4') has a cover (6) with a cylindrical protrusion (7).

6. The protective cap (4, 4') as claimed in claim 5,
wherein the protective cap (4, 4') has a T-shaped structure (10) for fixing the protective cap (4, 4') with a cable tie.

7. The protective cap (4, 4') as claimed in claim 6,
wherein the T-shaped structure (10) is oriented parallel to the open side face (5).

8. The protective cap (4, 4') as claimed in claim 6,
wherein the T-shaped structure (10) is integrally formed on the cover (6).

* * * * *